US012572886B2

(12) United States Patent
Wang et al.

(10) Patent No.: US 12,572,886 B2
(45) Date of Patent: Mar. 10, 2026

(54) USING COMPUTER MODELS TO PREDICT DELIVERY TIMES FOR AN ORDER DURING CREATION OF THE ORDER

(71) Applicant: Maplebear Inc., San Francisco, CA (US)

(72) Inventors: Shuai Wang, Milburn, NJ (US); Zi Wang, Mountain View, CA (US); Liang Chen, Sunnyvale, CA (US); Aman Jain, Barrie (CA); Xiangyu Wang, San Jose, CA (US); Jian Wang, Saratoga, CA (US)

(73) Assignee: Maplebear Inc., San Francisco, CA (US)

( * ) Notice: Subject to any disclaimer, the term of this patent is extended or adjusted under 35 U.S.C. 154(b) by 63 days.

(21) Appl. No.: 18/475,766

(22) Filed: Sep. 27, 2023

(65) Prior Publication Data

US 2025/0104003 A1     Mar. 27, 2025

(51) Int. Cl.
*G06Q 10/0834* (2023.01)
*G06Q 30/0601* (2023.01)
(52) U.S. Cl.
CPC ..... *G06Q 10/0834* (2013.01); *G06Q 30/0641* (2013.01)
(58) Field of Classification Search
CPC .... G06Q 10/08; G06Q 10/0834; G06Q 30/06; G06Q 30/0641
See application file for complete search history.

(56) References Cited

U.S. PATENT DOCUMENTS

| | | | |
|---|---|---|---|
| 2013/0325737 A1* | 12/2013 | Smalling | G06Q 10/083 705/330 |
| 2016/0189099 A1* | 6/2016 | Iqbal | G06Q 30/0633 705/26.8 |
| 2021/0365883 A1* | 11/2021 | Marbut, Jr. | G06Q 10/087 |
| 2022/0092669 A1* | 3/2022 | Abrahamian | G06Q 30/0631 |
| 2023/0206308 A1* | 6/2023 | Fan | G06Q 30/0633 705/26.8 |
| 2023/0289713 A1* | 9/2023 | Hulugundi | G06Q 30/0635 |
| 2023/0351477 A1* | 11/2023 | Cornacchia | G06Q 50/12 |
| 2024/0303561 A1* | 9/2024 | Mathur | G06Q 30/0282 |

OTHER PUBLICATIONS

Najjar, Lawrence J. "Designing e-commerce user interfaces." Handbook of human factors in Web design (2005): 514-527. (Year: 2005).*

* cited by examiner

*Primary Examiner* — Scott M Tungate
(74) *Attorney, Agent, or Firm* — Fenwick & West LLP

(57) ABSTRACT

One or more trained computer models are used to determine, at different stages of an order, an estimated time range for delivery of the order at an online system. The online system retrieves a set of candidate ranges of delivery times for the order. The online system applies the one or more computer models trained to predict a value of a metric for each candidate range in the set of candidate ranges, based on one or more features associated with the order. The online system selects a range of delivery times for the order from the set of candidate ranges, based on the predicted value of the metric for each candidate range. The online system causes a device of the user to display a user interface with the selected range of delivery times for the order.

18 Claims, 6 Drawing Sheets

Retrieve Set Of Candidate Ranges Of Delivery Times For Order At Online System
505

Access One Or More Computer Models Trained To Predict Metric For Each Candidate Range In Set Of Candidate Ranges
510

Apply One Or More Computer Models To Predict, Based On One Or More Features Associated With Order, Value of Metric For Each Candidate Range In Set of Candidate Ranges
515

Select, Based On Predicted Value Of Metric For Each Candidate Range In Set Of Candidate Ranges, Range Of Delivery Times For Order From Set Of Candidate Ranges
520

Cause Device Of User To Display User Interface With Selected Range Of Delivery Times For Order
525

300

User Interface 415

User Client Device 100

Falls Street
Ithaca, NY 14850

Choose delivery time

Priority
By: 12:20 – 12:55        +$2

Standard
By: 1:45 – 2:10

Choose 2-hour window
Starting 2pm Today

Choose 3-hour window
Starting 2pm Today        $2 off

Continue

Range 420

Range 425

Range 430

Range 435

USING COMPUTER MODELS TO PREDICT DELIVERY TIMES FOR AN ORDER DURING CREATION OF THE ORDER

BACKGROUND

Online systems, such as online concierge systems, offer to their users (i.e., customers) different service options for delivery of ordered items. For example, an online concierge system can provide different levels of delivery service options, such as one or more immediate delivery service options with varying priorities delivery experience and a scheduled delivery service option for delivery at a specified future time range. The immediate delivery service options can provide different levels of service to users of the online concierge system, such as a standard priority delivery service option and a priority delivery service option.

The online concierge system typically shows the different delivery times for the delivery service options at checkout. Typically, the online concierge system presents the estimated delivery ranges that provide arrival estimation within a late promise for users' expectations at the upper end, and/or an average delivery time at the lower end to provide proactive communications on order delivery status. This gives a user of the online concierge system an idea of when to expect the delivery and what the latest time of the delivery would be. The delivery service options provided to the user at the checkout can affect a likelihood that the user will place the order, how much the user will buy, and the cost of the order.

However, there are two major limitations of the current expected delivery range presentations. Firstly, the current system for expected delivery range presentations primarily focuses on late/early perceptions of expected delivery predictions. This shows sub-optimal performances in certain segments of users where the early/late based expected delivery ranges increase the cancellation rate and provide the higher-than-expected delivery cost. Secondly, the machine learning based expected delivery ranges are only applied at the order checkout. The lack of a coherent expected delivery presentation logic across different stages (or funnels) of the order (e.g., home page, store page, cart, checkout) creates diverged user experience. Additionally, the expected delivery presentation logic is disconnected and independent during different stages of the user shopping process. Therefore, it is important to provide both accurate and informative expected delivery range predictions to users of the online concierge system across different stages of the order. However, this leads to a technical problem of implementing an automatic process at the online concierge system that generates an accurate prediction of delivery times optimized for one or more metrics (e.g., conversion, revenue, and/or cost), while the predicted delivery times are provided to users of the online concierge system not only during the checkout but across different stages of the order.

SUMMARY

Embodiments of the present disclosure are directed to using one or more computer models to determine, at different stages of an order (i.e., during creation of the order) at an online system (e.g., online concierge system), a time range for delivery of the order.

In accordance with one or more aspects of the disclosure, the online system retrieves a set of candidate ranges of delivery times for an order at the online system associated with a user of the online system. The online system accesses one or more computer models of the online system trained to predict a metric for each candidate range in the set of candidate ranges. The online system applies the one or more computer models to predict a value of the metric for each candidate range in the set of candidate ranges, based at least in part on one or more features associated with the order. The online system selects a range of delivery times for the order from the set of candidate ranges, based at least in part on the predicted value of the metric for each candidate range in the set of candidate ranges. The online system causes a device of the user to display a user interface with the selected range of delivery times for the order.

DETAILED DESCRIPTION

Figure 1:
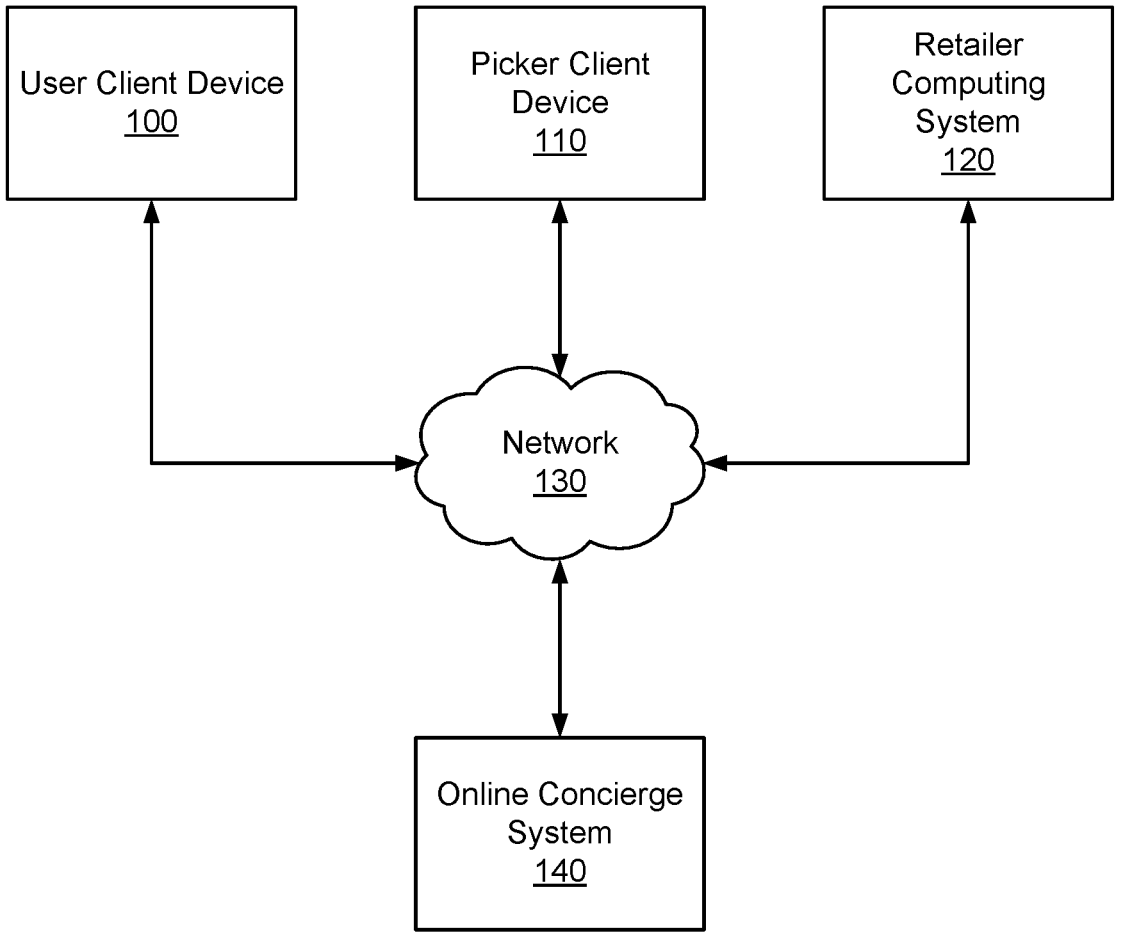
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item", as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 provides a predicted range of delivery times (e.g., for one or more delivery service options) to a user of the online concierge system 140 who is building an order to be picked and delivered to the user. The predicted range of delivery times may be optimized, e.g., in terms of accuracy, likelihood of conversion, expected revenue, cost of fulfillment, some other metric, or some combination thereof. To determine the optimized range of delivery times for displaying to the user, the online concierge system 140 may first retrieve (or, more generally, select) a set of candidate ranges of delivery times. Then, for each candidate range in the set, the online concierge system 140 may compute a score value (or, more generally, a value of a metric) by deploying one or more trained computer models that estimate a likelihood of conversion, an expected revenue, and/or a cost of fulfillment (i.e., one or more components of the metric). The online concierge system 140 may select the range of delivery times with the best score value and displays the selected range to the user at a user interface of the user client device 100. The online concierge system 140 may update ranges of delivery times displayed to the user during the cart building and at checkout, and the displayed ranges may be updated upon certain triggering events that can affect the optimized range of delivery times. In this manner, as the order advances through different stages (or "funnels"), the online concierge system 140 may display to the user updated optimized ranges of delivery times at different stages of the order, i.e., during creation of the order. The online concierge system 140 is described in further detail below with regards to FIG. 2.

Figure 2:
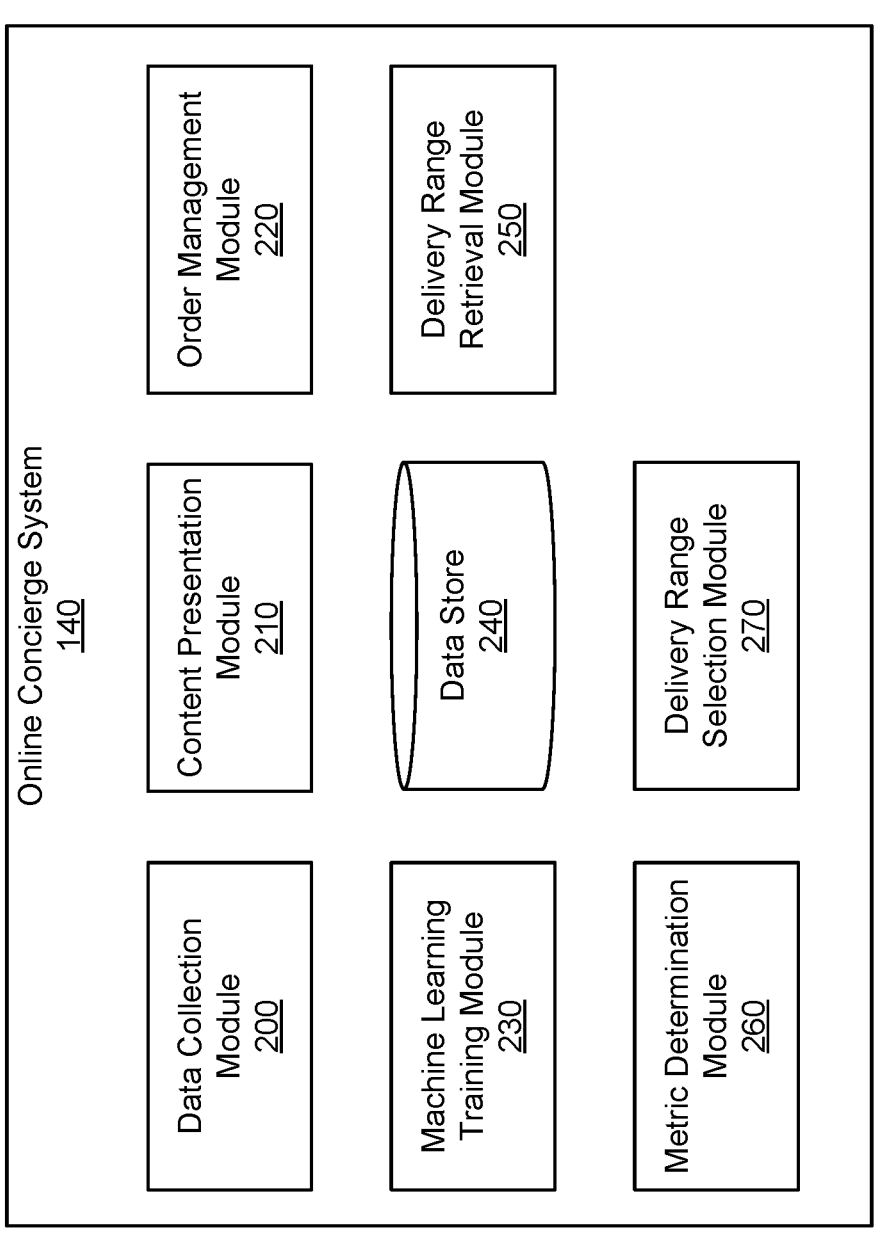
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a delivery range retrieval module 250, a metric determination module 260, and a delivery range selection module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/ retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item.

The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

A user of the online concierge system 140 may start building a cart (i.e., an order). Upon each triggering event associated with the online concierge system 140, the online concierge system 140 may recompute one or more ranges of delivery times and update a user interface at the user client device 100 with the one or more new predicted ranges. This process may be repeated for each triggering event until the checkout. Examples of triggering events are: (1) adding an item to the cart; (2) changing a stage of the order (i.e., funnel or context of the order), such as visiting a home page, visiting a storefront page, visiting a cart page, and visiting a checkout page; and (3) one or more external changes to a marketplace associated with the online concierge system 140, such as one or more changes of supply and/or demand at the online concierge system 140 due to, e.g., changing of a number of pickers over time that are available for fulfilling an order which affects a fulfillment cost for the order.

Responsive to the triggering event, the delivery range retrieval module 250 may retrieve a set of candidate ranges of delivery times for the order that is currently being built by the user. The delivery range retrieval module 250 may retrieve the set of candidate ranges by applying one or more business rules and/or using certain historical observations. When applying the business rules, the set of candidate ranges may satisfy, e.g., a minimum Estimated Time of Arrival (ETA) range of 20 minutes from a current timestamp may be provided, an ETA range for the standard ETA (sETA) delivery service option that is at least a minimum amount of time longer than an ETA range for the priority ETA (pETA) delivery service option, etc. The delivery range retrieval module 250 may also retrieve the set of candidate ranges by sweeping through a pool of candidate ranges (e.g., as available at the data store 240) and retrieving a predetermined number of candidate ranges from the pool (e.g., based on the historical observations).

In one or more embodiments, the delivery range retrieval module 250 applies a computer model (e.g., machine-learning computer model) trained to determine the set of candidate ranges of delivery times. The computer model deployed by the delivery range retrieval module 250 may run a machine-learning algorithm to determine the set of candidate ranges of delivery times based on at least one of: one or more business rules (e.g., business logic needs), one or more heuristic rules, or one or more historical observations. A set of parameters for the computer model deployed by the delivery range retrieval module 250 may be stored on one or more non-transitory computer-readable media of the delivery range retrieval module 250. Alternatively, the set of parameters for the computer model deployed by the delivery range retrieval module 250 may be stored on one or more non-transitory computer-readable media of the data store 240.

The delivery range retrieval module 250 may retrieve the set of candidate ranges for a single delivery service option (e.g., the sETA delivery service option or the pETA delivery service option). Alternatively, the delivery range retrieval module 250 may retrieve the set of candidate ranges as quadruples of candidate ranges for both sETA and pETA delivery service options. In such cases, for each candidate range, the delivery range retrieval module 250 may retrieve an ETA candidate range quadruple (pETA starts_at, pETA ends_at, sETA starts_at, SETA ends_at). In one or more embodiments, the pETA starts_at is at least 20 minutes from a current timestamp, pETA ends_at is at least 45 minutes from the current timestamp, and each component of the ETA candidate range quadruple can extend to a respective predefined amount of maximal minutes. Thus, for example, the delivery range retrieval module 250 may retrieve the set of candidate ranges that includes ETA candidate range quadruples (20, 45, 75, 100), (20, 45, 80, 105), . . . , (230, 250, 280, 300) as possible ETA candidate ranges for display to the user. The delivery range retrieval module 250 may also apply one or more rules to filter out one or more candidate ranges that are undesired before the candidate ranges from the set of candidate ranges are being scored and ranked. The delivery range retrieval module 250 may determine a preferred number of candidate ranges of delivery times in the set based on, e.g., heuristic rules, business logic needs, and/or historical observations.

The metric determination module 260 may determine one or more values of one or more metrics for each candidate range in the set of candidate ranges retrieved by the delivery range retrieval module 250. The metric determination module 260 may determine a final metric value (e.g., score value) for each candidate range based on the one or more values of the one or more metrics (e.g., components of the score value). The one or more computer models deployed by the metric determination module 260 may run one or more machine-learning algorithms to predict the one or more values of the one or more metrics for each candidate range, based on one or more inputs provided to the one or more computer models. Each candidate range in the retrieved set of candidate ranges that is also provided to the one or more computer models may include, e.g., a quadruple of ETA ranges (pETA starts_at, pETA ends_at, sETA starts_at, sETA ends_at). A set of parameters for the one or more computer models deployed by the metric determination module 260 may be stored on one or more non-transitory computer-readable media of the metric determination module 260. Alternatively, the set of parameters for the one or more computer models deployed by the metric determination module 260 may be stored on one or more non-transitory computer-readable media of the data store 240.

The one or more inputs to the one or more computer models deployed by the metric determination module 260 may include information about one or more categories of features, such as: (1) one or more features of the user; (2) one or more features of the order (or cart); (3) one or more features of the marketplace; and/or (4) one or more features of a stage ("funnel" or context) of the order at which the user is about to see the range. The one or more features of the user may include one or more features that model user's behaviors such as: order history, sensitivity on delivery speed, visit patterns, user's recent visit activity, user's order timing, user's checkout conversion history, etc. The one or more features of the order (or cart) may include one or more features that model the visit characteristics, such as: a gross monetary value GMV of the cart, a number of items in the cart, a quantity of each item in the cart, a distance from a grocery store (or warehouse) to a location of the user, etc. The one or more features of the marketplace may include one or more features that model the supply and demand state of the overall marketplace, such as: a recent averaged acknowledged orders time, outstanding order count at warehouse/zone levels, recent picker counts within a defined range from the warehouse location, etc. The one or more features of the stage of the order may include one or more features that model the stage of user activities, such as: browsing at a home page, browsing at a storefront page, going to checkout, a page type where the user is currently at, information about a retailer, information whether a sale is regular or promotion, etc. Note that the inputs to each of the one or more computer models deployed by the metric determination module 260 may be the same or highly overlapping across different computer models.

The metric determination module 260 may deploy a first computer model of the one or more computer models trained to estimate a conversion rate, pCVR, for each range candidate from the retrieved set of candidate ranges, where, e.g., $pCVR \in \{0, 1\}$. The first computer model deployed by the metric determination module 260 can be also referred to as a "conversion model". The first computer model (or conversion model) may be a classification type model (e.g., neural network, decision tree, some other type or classification model, or some combination thereof) that predicts a likelihood that a specific range candidate (e.g., ETA range quadruple) will convert to pETA delivery service order, sETA delivery service order, or some other type of delivery service order. In other words, the metric determination module 260 may deploy the first computer model to determine how likely the user will convert to place the order given the displayed ETA ranges of delivery times.

The metric determination module 260 may deploy a second computer model of the one or more computer models trained to estimate a cost of fulfillment (i.e., pCost) of the order given each candidate range from the retrieved set of candidate ranges, where, e.g., $pCost \in \{0, 1000\}$. In other words, the metric determination module 260 may deploy the second computer model to estimate what would be a cost for the online concierge system 140 for fulfilling the order given the displayed ETA ranges of delivery times. In one or more embodiments, the second computer model estimates the cost of fulfillment of the order for each candidate range as a weighted combination of expected costs for the pETA delivery service option and the sETA delivery service option, weighted by a likelihood of conversion for each of the pETA and sETA delivery service options (e.g., as determined via the first computer model). The second computer model deployed by the metric determination module 260 can be also referred to as a "cost model". The second computer model (or the cost model) may be a regression type model, e.g., a gradient based boost tree model, neural network model, some other type of regression model, or some combination thereof suitable for estimating a cost of an order.

The metric determination module 260 may deploy a third computer model of the one or more computer models trained to estimate a revenue (e.g., GMV), pGMV, associated with the order at a particular stage of the order for each candidate range from the retrieved set of candidate ranges, where, e.g., $pGMV \in \{0, 1000\}$. In other words, the metric determination module 260 may deploy the third computer model to estimate how likely an order with a higher GMV will be placed given the displayed ETA ranges. The third computer model deployed by the metric determination module 260 can be also referred to as a "revenue model". The third computer model (or the revenue model) may be a regression type model, e.g., a gradient based boost tree model, neural network model, some other type of regression model, or some combination thereof suitable for estimating a GMV of an order. Alternatively, instead of deploying the third computed model, the metric determination module 260 may generate a signal (e.g., real-time signal) based on current content of the order (i.e., current content of a shopping cart). The metric determination module 260 may then provide the generated signal to, e.g., the delivery range selection module 270 that selects a delivery range for displaying to the user.

The metric determination module 260 may determine a score value (or, more generally, a metric value) for each range candidate by combining a value of a first metric determined by the first computer model (e.g., conversion rate, pCVR), a value of a second metric determined by the second computer model (e.g., cost of fulfillment, pCost), and a value of a third metric determined by the third computer model (e.g., revenue, pGMV). The metric determination module 260 may compute the score value for each candidate range in the set of candidate ranges as:

$$Score_{candidate} = pCVR(candidate) \times pGMV - \alpha \cdot pCost(candidate), \quad (1)$$

where $\alpha$ is a cost scaling factor (which may not depend on a specific candidate range). It should be also noted from Eq. (1) that the value of the third metric (e.g., revenue, pGMV) may not depend on a specific candidate range.

The delivery range selection module 270 may select a candidate range that has the highest score as computed by Eq. (1), i.e., "the best" candidate range for a given stage of the order. The candidate range selected by the delivery range selection module 270 for the given stage of the order (e.g., home page, cart page, storefront page, checkout) may be represented as an ETA range quadruple, i.e., (pETA starts_at, pETA ends_at, sETA starts_at, sETA ends_at). Thus, for the selected ETA range quadruple, it holds that:

$$(pETA\ starts_{at}, pETA\ ends_{at}, sETA\ starts_{at}, sETA\ ends_{at}) \sim \quad (2)$$
$$max(Score_{candidate_1}, Score_{candidate_2}, \ldots, Score_{candidate_n}).$$

Responsive to selecting the range of delivery times by the delivery range selection module 270, the content presentation module 210 may cause a device of the user (e.g., the user client device 100) to display a user interface with the selected range of delivery times at a given stage of the order (e.g., home page, cart page, storefront page, checkout). In general, the content presentation module 210 may cause the device of the user to display the user interface with the selected range of delivery times at each stage the order, wherein the selected and displayed range of delivery times is updated in response to each triggering event at the online concierge system 140 (e.g., adding an item in a cart associated with the order, changing a stage of the order, and/or external change of a state of a marketplace associated with the online concierge system 140).

It should be noted that feature values and user behavior information that are input to the one or more computer models deployed by the metric determination module 260 can be collected using historical order information and historical visit information and stored at, e.g., the data store 240. The feature values may be collected in a recurring manner to retrain (or, more generally, update) the one or more compute models regularly (e.g., on a daily basis). The machine-learning training module 230 may train each of the first, second and third computer models deployed by the metric determination module 260 to optimize a respective loss objective that is based on a type of the computer model. For example, the machine-learning training module 230 may train the classification type model (e.g., the first computer model or the conversion model) using categorical accuracy data to select the model hyperparameters with best performance.

The machine-learning training module 230 may update at least one of the first computer model, the second computer model, or the third computer model at predefined time intervals (e.g., once per day, twice a day, etc.). The machine-learning training module 230 may evaluate performance of a corresponding trained computer model (e.g., loss, accuracy, and/or other metrics) compared to performance of a reference computer model (e.g., the computer model currently in use) using the same set of evaluation data. If the newly trained computer model has better performance than the reference computer model, the reference computer model would be replaced with the newly trained computer model.

Figure 3:
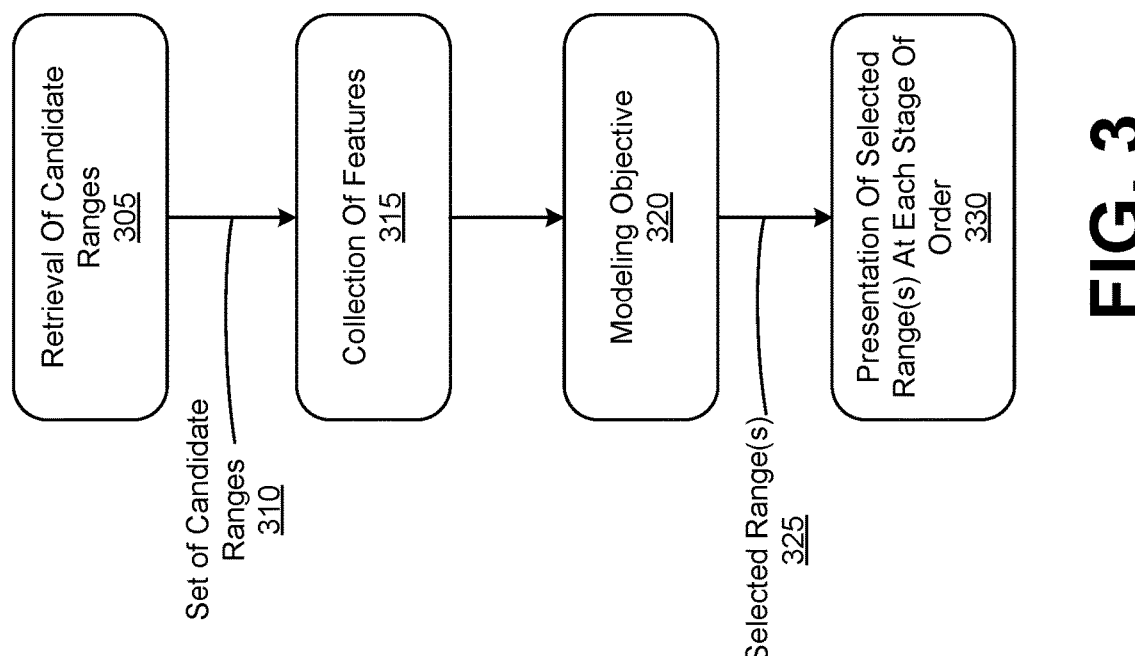
FIG. 3 illustrates an example system flow at an online concierge system, in accordance with one or more embodiments.

FIG. 3 illustrates an example system flow 300 at the online concierge system 140, in accordance with one or more embodiments. At 305, the delivery range retrieval module 250 may perform a retrieval of a set of candidate ranges of delivery times 310. Each candidate range in the set of candidate ranges 310 may be an ETA range quadruple (pETA starts_at, pETA ends_at, sETA starts_at, sETA ends_at). The set of candidate ranges 310 may be provided to a collection of features 315, e.g., user's features, marketplace features, cart features, and order stage (or funnel) features (e.g., as stored at the data store 240). The collection of features 315 (together with the set of candidate ranges 310) may be provided to one or more computer models of the online concierge system 140 as part of a modeling objective 320 (e.g., the one or more computer models deployed by the metric determination module 260).

The one or more computer models may perform, as part of the modeling objective 320, one or more algorithms (e.g., machine-learning algorithms) to determine one or more objectives (i.e., one or more metrics) for each candidate range in the set of candidate ranges 310 given the collection of features 315. As part of the modeling objective 320, the one or more computer models may determine, e.g., a conversion rate, cost and/or revenue for each candidate range in the set of candidate ranges 310 given the collection of features 315. The modeling objective 320 may output (e.g., via the delivery range selection module 270) one or more selected ranges of delivery times 325 for presentation to the user. At 330, the online concierge system 140 may cause (e.g., via the content presentation module 210) a device of the user (e.g., the user client device 100) to display at a user interface with the one or more selected ranges of delivery times 325 for a given stage of the order. The process illustrated in FIG. 3 may be repeated for each triggering event at the online concierge system 140 (e.g., adding an item in a cart, changing a stage of the order, and/or change of a state of a marketplace).

Figure 4A:
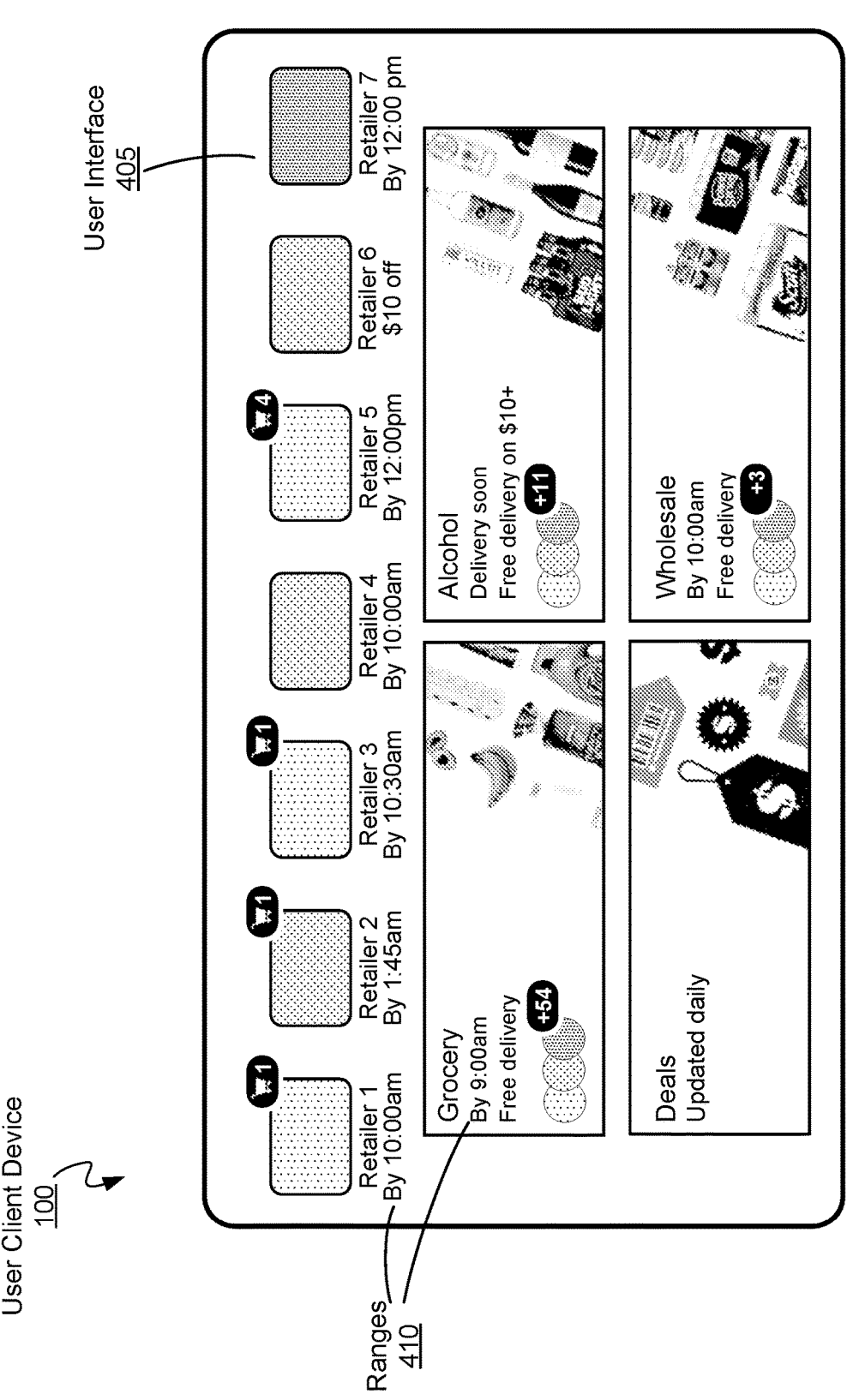
FIG. 4A illustrates an example user interface displayed at a user client device at a first stage of an order, in accordance with one or more embodiments.

FIG. 4A illustrates an example user interface 405 displayed at the user client device 100 at a first stage of an order, in accordance with one or more embodiments. The content presentation module 210 may cause the user client device 100 to display the user interface 405 with ranges of delivery times 410 when a user of the online concierge system 140 is at a home page. A different range of delivery times 410 may be provided for each retailer or a set of related retailers. The user can use the displayed information about different ranges of delivery times to select a particular retailer for building an order.

Figure 4B:
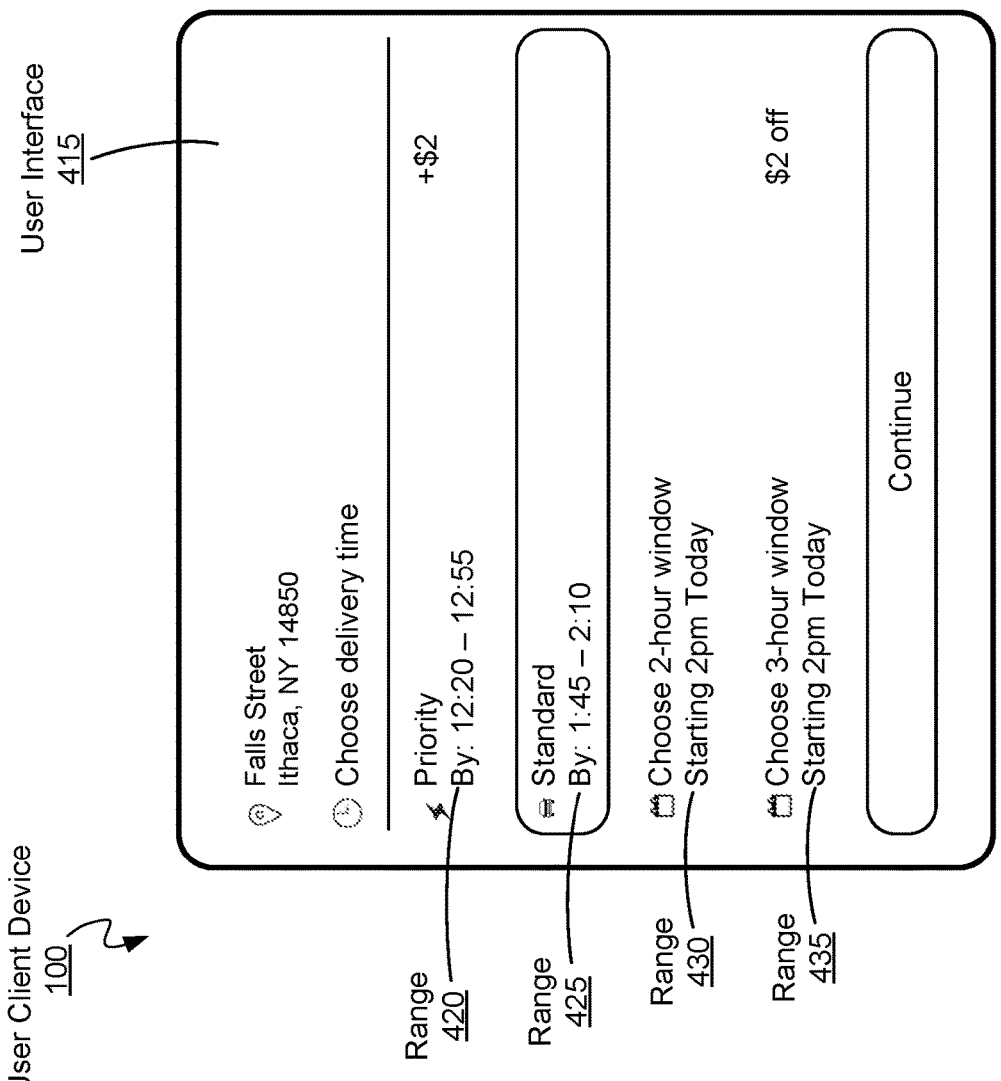
FIG. 4B illustrates an example user interface displayed at a user client device at a second stage of the order, in accordance with one or more embodiments.

FIG. 4B illustrates an example user interface 415 displayed at the user client device 100 at a second stage of the order, in accordance with one or more embodiments. The content presentation module 210 may cause the user client device 100 to display the user interface 415 with ranges of delivery times when a user of the online concierge system 140 is at the checkout. The user interface 415 may display a range of delivery times 420 for the priority delivery service (pETA delivery service option), and a range of delivery times 425 for the standard delivery service (sETA delivery service option). The user interface 415 may further display a range of delivery times 430 for, e.g., a "2-hour window" delivery service option, as well as a range of delivery times 435 for, e.g., a "3-hour window" delivery service option. The user can then use the displayed information about different ranges of delivery times to select the most suitable delivery service option at the checkout.

Figure 5:
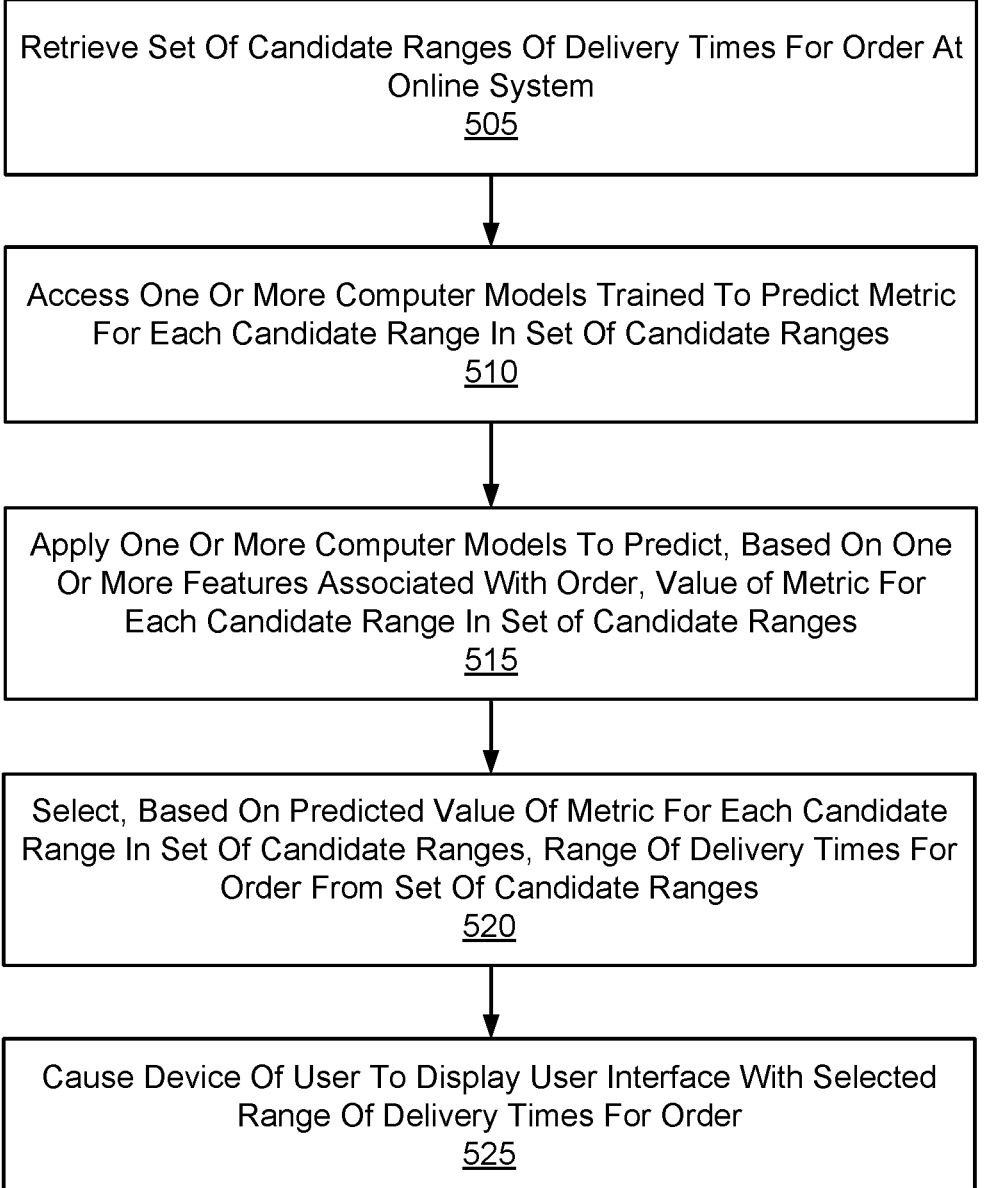
FIG. 5 is a flowchart for a method of using one or more computer models to determine, during creation of an order, a time range for delivery of the order at an online concierge system, in accordance with one or more embodiments.

FIG. 5 is a flowchart for a method of using one or more computer models to determine, during creation of an order, a time range for delivery of the order at an online concierge system, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 retrieves 505 (e.g., via the delivery range retrieval module 250) a set of candidate ranges of delivery times for an order at the online concierge system 140 associated with a user of the online concierge system 140. The online concierge system 140 may retrieve (e.g., via the delivery range retrieval module 250) each candidate range in the set of candidate ranges for a plurality of service options of the online concierge system for delivery of the order (e.g., sETA and pETA delivery service options), wherein each of the plurality of service options is associated with a respective delivery time of a plurality of delivery times.

The online concierge system 140 accesses 510 one or more computer models of the online concierge system 140 (e.g., via the metric determination module 260) trained to predict a metric for each candidate range in the set of candidate ranges. The online concierge system 140 applies 515 the one or more computer models (e.g., via the metric determination module 260) to predict, based at least in part on one or more features associated with the order, a value of the metric for each candidate range in the set of candidate ranges. The online concierge system 140 may apply the one or more computer models (e.g., via the metric determination module 260) to predict the value of the metric for each candidate range in the set of candidate ranges based on at least one of: one or more features of the user, one or more features of a cart of the user associated with the order, one or more features of a marketplace associated with the online concierge system, or one or more features of a current stage of the order. The online concierge system 140 may apply the one or more computer models (e.g., via the metric determination module 260) to predict, for each candidate range in the set of candidate ranges, at least one of: a likelihood of conversion of the order by the user, a cost of fulfillment of the order, or a revenue associated with the order. The online concierge system 140 may determine (e.g., via the metric determination module 260), based on at least one of the predicted likelihood of conversion, the predicted revenue, or the predicted cost of fulfillment, the value of the metric for each candidate range in the set of candidate ranges.

The online concierge system 140 may apply (e.g., via the metric determination module 260) a first computer model of the one or more computer models (e.g., the conversion model) to predict, for each candidate range in the set of candidate ranges, a likelihood of conversion of the order by the user based on one or more features of the user. The online concierge system 140 may determine (e.g., via the metric determination module 260), based at least in part on the predicted likelihood of conversion, the value of the metric for each candidate range in the set of candidate ranges. The online concierge system 140 may apply (e.g., via the metric determination module 260) a second computer model of the one or more computer models (e.g., the cost model) to predict, for each candidate range in the set of candidate ranges, a cost of fulfillment of the order. The online concierge system 140 may determine (e.g., via the metric determination module 260), further based on the predicted cost of fulfillment, the value of the metric for each candidate range in the set of candidate ranges. The online concierge system 140 may apply (e.g., via the metric determination module 260) the second computer model to predict, for each candidate range in the set of candidate ranges, a first cost of fulfillment of the order for a first service option of the online concierge system 140 for delivery of the order associated with a first delivery time (e.g., pETA delivery service option). The online concierge system 140 may apply (e.g., via the metric determination module 260) the second computer model to predict, for each candidate range in the set of candidate ranges, a second cost of fulfillment of the order for a second service option of the online concierge system 140 for delivery of the order associated with a second delivery time that is longer than the first delivery time (e.g., sETA delivery service option). The online concierge system 140 may apply (e.g., via the metric determination module

260) the second computer model to predict, for each candidate range in the set of candidate ranges, the cost of fulfillment based on the first cost of fulfillment and the second cost of fulfillment. The online concierge system 140 may apply (e.g., via the metric determination module 260) a third computer model of the one or more computer models (e.g., the revenue model) to predict a revenue associated with the order based on one or more features of a cart associated with the order. The online concierge system 140 may determine (e.g., via the metric determination module 260) the value of the metric further based on the predicted revenue.

The online concierge system 140 selects 520 (e.g., via the delivery range selection module 270), based at least in part on the predicted value of the metric for each candidate range in the set of candidate ranges, a range of delivery times for the order from the set of candidate ranges. The online concierge system 140 causes 525 (e.g., via the content presentation module 210) a device of the user (e.g., the user client device 100) to display a user interface with the selected range of delivery times (i.e., delivery option) for the order. The user may then select, via the user interface, a given delivery option (e.g., at checkout). Based on the user's selection, the online concierge system 140 may updates parameters of at least one of the first computer model, the second computer model or the third computer model.

In one or more embodiments, at least one of the steps 505, 510, 515, 520, 525 is performed in response to a triggering event associated with the online concierge system 140. The triggering event may be a navigation of the user through a point in the user interface that enables the user to browse or search for items, add one or more items to a cart, and then proceed to checkout. The triggering event may comprise at least one of adding an item in the cart, changing a stage of the order at the online concierge system 140, or one or more changes of a state of a marketplace associated with the online concierge system 140. The online concierge system 140 may cause (e.g., via the content presentation module 210) the device of the user to display the user interface with the selected range of delivery times at each stage of a plurality of stages of the order, wherein a start of each stage of the order may cause the triggering event.

Embodiments of the present disclosure are directed to utilizing trained computer models to predict ETA delivery ranges based on an expected value score, with a different computer model predicting a respective component of the score (i.e., value of a metric). The online concierge system 140 presented herein predicts and displays personalized ETA delivery ranges at different stages of an order (e.g., home page, storefront, cart, checkout,). The online concierge system 140 optimizes and tunes desired marketplace outcomes across different stages of an order by having a general machine-learning based framework to predict accurate ETA delivery ranges. The approach presented herein represents an innovative and powerful marketplace lever for business metric targets (e.g., conversion, cost, revenue, etc.). Furthermore, the presented approach provides an improved user experience by balancing the earliness and the lateness of ETA delivery range predictions, while having flexibility to work on a wide range of business use cases across different stages of an order and delivery option variations. The online concierge system 140 presented herein is tailored to both business needs and the users shopping experience.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network and from a device associated with a user of an online system, information about a triggering event indicating a change of a stage of an order associated with the user, the order having a plurality of stages, the triggering event caused in response to an interaction of the user with a user interface of the device;

responsive to receiving the information about the triggering event, retrieving a set of candidate ranges of delivery times for each stage of the plurality of stages of the order;

responsive to retrieving the set of candidate ranges, applying, for each stage of the order, each of a plurality of machine-learning models to one or more features associated with the order and one or more features of each stage of the order to generate, for each stage of the order, a value of a respective metric of a plurality of metrics for each candidate range in the set of candidate ranges;

determining, for each stage of the order and using values of the plurality of metrics generated by the plurality of machine-learning models for each candidate range in the set of candidate ranges, a final metric value for each candidate range in the set of candidate ranges;

selecting, for each stage of the order and using the final metric value for each candidate range in the set of candidate ranges, a range of delivery times for the order from the set of candidate ranges;

causing, for each stage of the order, the device associated with the user to update the user interface so that the updated user interface displays the range of delivery times for the order selected for that stage of the order;

receiving, via the network and from the device associated with the user, information about the user placing the order after the plurality of stages;

responsive to the user placing the order, assigning a servicing of the order to a picker that is a fully-autonomous robot; and upon assigning the servicing of the order, instructing the picker operating as the fully-autonomous robot to collect a set of items of the order in a retailer location and deliver the set of items to the user by using an autonomous vehicle.

2. The method of claim 1, further comprising:

performing, in response to the triggering event, at least one of retrieving the set of candidate ranges, applying the plurality of machine-learning models, selecting the range of delivery times, determining the final metric value, or displaying the user interface with the selected range, the triggering event comprising a navigation of the user through a point in the user interface that enables the user to browse or search for items, add one or more items to a cart, and then proceed to checkout.

3. The method of claim 2, wherein the triggering event further comprises at least one of:

adding an item in the cart;

changing the stage of the order at the online system; or one or more changes of a state of a marketplace associated with the online system.

4. The method of claim 2, wherein a start of each stage of the plurality of stages causes the triggering event.

5. The method of claim 1, wherein retrieving the set of candidate ranges comprises:

retrieving each candidate range in the set of candidate ranges for a plurality of service options of the online system for delivery of the order, each of the plurality of service options associated with a respective delivery time of a plurality of delivery times.

6. The method of claim 1, wherein applying each of the plurality of machine-learning models comprises:

applying each of the plurality of machine-learning models further to at least one of one or more features of the user, one or more features of a cart of the user associated with the order, or one or more features of a marketplace associated with the online system to generate the value of the respective metric for each candidate range in the set of candidate ranges.

7. The method of claim 1, wherein applying each of the plurality of machine-learning models comprises:

applying each of the plurality of machine-learning models trained to predict, for each candidate range in the set of candidate ranges, a different one of a likelihood of conversion of the order by the user, a cost of fulfillment of the order, and a revenue associated with the order; and determining, using the likelihood of conversion, the revenue, and the cost of fulfillment, the final metric value for each candidate range in the set of candidate ranges.

8. The method of claim 1, wherein applying each of the plurality of machine-learning models comprises:

applying a first machine-learning model of the plurality of machine-learning models further to one or more features of the user to predict, for each candidate range in the set of candidate ranges, a likelihood of conversion of the order by the user; and determining, using the likelihood of conversion, the final metric value for each candidate range in the set of candidate ranges.

9. The method of claim 8, wherein applying each of the plurality of machine-learning models further comprises:

applying a second machine-learning model of the plurality of machine-learning models to predict, for each candidate range in the set of candidate ranges, a cost of fulfillment of the order; and determining, further using the cost of fulfillment, the final metric value for each candidate range in the set of candidate ranges.

10. The method of claim 9, wherein applying the second machine-learning model comprises:

applying the second machine-learning model to predict, for each candidate range in the set of candidate ranges, a first cost of fulfillment of the order for a first service option of the online system for delivery of the order associated with a first delivery time;

applying the second machine-learning model to predict, for each candidate range in the set of candidate ranges, a second cost of fulfillment of the order for a second service option of the online system for delivery of the order associated with a second delivery time that is longer than the first delivery time; and applying the second machine-learning model to predict, for each candidate range in the set of candidate ranges, the cost of fulfillment using the first cost of fulfillment and the second cost of fulfillment.

11. The method of claim 9, wherein applying each of the plurality of machine-learning models further comprises:

applying a third machine-learning model of the plurality of machine-learning models further to one or more features of a cart associated with the order to predict a revenue associated with the order; and determining, further using the revenue, the final metric value for each candidate range in the set of candidate ranges.

12. A computer program product comprising a non-transitory computer readable storage medium having instructions encoded thereon that, when executed by a processor, cause the processor to perform steps comprising:

receiving, via a network and from a device associated with a user of an online system, information about a triggering event indicating a change of a stage of an order associated with the user, the order having a plurality of stages, the triggering event caused in response to an interaction of the user with a user interface of the device;

responsive to receiving the information about the triggering event, retrieving a set of candidate ranges of delivery times for each stage of the plurality of stages of the order;

responsive to retrieving the set of candidate ranges, applying, for each stage of the order, each of a plurality of machine-learning models to one or more features associated with the order and one or more features of each stage of the order to generate, for each stage of the order, a value of a respective metric of a plurality of metrics for each candidate range in the set of candidate ranges;

determining, for each stage of the order and using values of the plurality of metrics generated by the plurality of machine-learning models for each candidate range in the set of candidate ranges, a final metric value for each candidate range in the set of candidate ranges;

selecting, for each stage of the order and using the final metric value for each candidate range in the set of candidate ranges, a range of delivery times for the order from the set of candidate ranges;

causing, for each stage of the order, the device associated with the user to update the user interface so that the updated user interface displays the range of delivery times for the order selected for that stage of the order;

receiving, via a network and from the device associated with the user, information about the user placing the order after the plurality of stages;

responsive to the user placing the order, assigning a servicing of the order to a picker that is a fully-autonomous robot; and upon assigning the servicing of the order, instructing the picker operating as the fully-autonomous robot to collect a set of items of the order in a retailer location and deliver the set of items to the user by using an autonomous vehicle.

13. The computer program product of claim 12, wherein the instructions further cause the processor to perform the steps in response to the triggering event, the triggering event comprising a navigation of the user through a point in the user interface that enables the user to browse or search for items, add one or more items to a cart, and then proceed to checkout.

14. The computer program product of claim 12, wherein the instructions further cause the processor to perform steps comprising:

retrieving each candidate range in the set of candidate ranges for a plurality of service options of the online system for delivery of the order, each of the plurality of service options associated with a respective delivery time of a plurality of delivery times.

15. The computer program product of claim 12, wherein the instructions further cause the processor to perform steps comprising:

applying each of the plurality of machine-learning models further to at least one of one or more features of the user, one or more features of a cart of the user associated with the order, or one or more features of a marketplace associated with the online system to generate the value of the respective metric for each candidate range in the set of candidate ranges.

16. The computer program product of claim 12, wherein the instructions further cause the processor to perform steps comprising:

applying each of the plurality of machine-learning models trained to predict, for each candidate range in the set of candidate ranges, a different one of a likelihood of conversion of the order by the user, a cost of fulfillment of the order, and a revenue associated with the order; and determining, using the likelihood of conversion, the revenue, and the cost of fulfillment, the final metric value for each candidate range in the set of candidate ranges.

17. The computer program product of claim 12, wherein the instructions further cause the processor to perform steps comprising:

applying a first machine-learning model of the plurality of machine-learning models to one or more features of the user to predict, for each candidate range in the set of candidate ranges, a likelihood of conversion of the order by the user;

applying a second machine-learning model of the plurality of machine-learning models to predict, for each candidate range in the set of candidate ranges, a cost of fulfillment of the order;

applying a third machine-learning model of the plurality of machine-learning models further to one or more features of a cart associated with the order to predict a revenue associated with the order; and determining, further using the likelihood of conversion, the cost of fulfillment and the revenue, the final metric value for each candidate range in the set of candidate ranges.

18. A computer system comprising:

a processor; and a non-transitory computer-readable storage medium having instructions that, when executed by the processor, cause the computer system to perform steps comprising:

receiving, via a network and from a device associated with a user of an online system, information about a triggering event indicating a change of a stage of an order associated with the user, the order having a plurality of stages, the triggering event caused in response to an interaction of the user with a user interface of the device;

responsive to receiving the information about the triggering event, retrieving a set of candidate ranges of delivery times for each stage of the plurality of stages of the order;

responsive to retrieving the set of candidate ranges, applying, for each stage of the order, each of a plurality of machine-learning models to one or more features associated with the order and one or more features of each stage of the order to generate, for each stage of the order, a value of a respective metric of a plurality of metrics for each candidate range in the set of candidate ranges;

determining, for each stage of the order and using values of the plurality of metrics generated by the plurality of machine-learning models for each candidate range in the set of candidate ranges, a final metric value for each candidate range in the set of candidate ranges;

selecting, for each stage of the order and using the final metric value for each candidate range in the set of candidate ranges, a range of delivery times for the order from the set of candidate ranges;

causing, for each stage of the order, the device associated with the user to update the user interface so that the updated user interface displays the range of delivery times for the order selected for that stage of the order;

receiving, via the network and from the device associated with the user, information about the user placing the order after the plurality of stages;

responsive to the user placing the order, assigning a servicing of the order to a picker that is a fully-autonomous robot; and upon assigning the servicing of the order, instructing the picker operating as the fully-autonomous robot to collect a set of items of the order in a retailer location and deliver the set of items to the user by using an autonomous vehicle.

\*    \*    \*    \*    \*